(12) United States Patent  
Burkhalter et al.

(10) Patent No.: US 7,252,138 B2
(45) Date of Patent: Aug. 7, 2007

(54) FLOW THROUGH TUBE PLUG

(75) Inventors: Larry Junior Burkhalter, LaPorte, TX (US); Michael Stanley DeCourcy, Houston, TX (US); Stephan Kenneth Weinberg, Houston, TX (US); Keith Frederick Briegel, Houston, TX (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/194,430

(22) Filed: Aug. 1, 2005

(65) Prior Publication Data

US 2006/0096736 A1    May 11, 2006

Related U.S. Application Data

(60) Provisional application No. 60/598,026, filed on Aug. 2, 2004.

(51) Int. Cl.
F28F 7/00 (2006.01)
(52) U.S. Cl. .................. 165/76; 29/890.031
(58) Field of Classification Search .......... 165/76; 29/890.031
See application file for complete search history.

(56) References Cited

U.S. PATENT DOCUMENTS

| 2,225,615 | A | * | 12/1940 | Bay | 165/133 |
| 2,672,161 | A | | 3/1954 | Morris | |
| 2,716,428 | A | * | 8/1955 | Pennella | 165/134.1 |
| 3,270,807 | A | * | 9/1966 | Steadman | 165/174 |
| 3,592,261 | A | * | 7/1971 | Black | 165/178 |
| 3,707,186 | A | * | 12/1972 | Zorrilla et al. | 165/134.1 |
| 4,396,059 | A | * | 8/1983 | Banner et al. | 165/134.1 |
| 4,607,689 | A | * | 8/1986 | Mochida et al. | 165/110 |
| 4,697,634 | A | * | 10/1987 | Foucher et al. | 165/76 |
| 4,877,014 | A | * | 10/1989 | Beasley | 126/116 R |
| 4,941,512 | A | | 7/1990 | McParland | |
| 5,167,907 | A | | 12/1992 | Mauget et al. | |
| 5,201,118 | A | | 4/1993 | McParland | |
| 5,263,515 | A | | 11/1993 | Goodale et al. | |
| 5,979,545 | A | * | 11/1999 | Pierce | 165/158 |
| 6,384,274 | B1 | | 5/2002 | Elder et al. | |
| 6,545,176 | B1 | | 4/2003 | Tsay et al. | |
| 2001/0040024 | A1 | | 11/2001 | Blanda, Jr. et al. | |
| 2002/0192131 | A1 | | 12/2002 | Dussaud et al. | |
| 2004/0093860 | A1 | | 5/2004 | DeCourcy et al. | |

FOREIGN PATENT DOCUMENTS

EP    0607052    7/1994

* cited by examiner

Primary Examiner—Teresa J. Walberg
(74) Attorney, Agent, or Firm—Marcella M. Bodner

(57) ABSTRACT

A method and apparatus for the repair of damaged tubes, such as heat exchanger tubes, comprising inserting a flow through plug into the damaged heat exchanger tube. The flow through plug is tapered and creates a press fit when inserted within the heat exchanger tube. The flow through plug has an aperture along its axis, thus allowing for flow lengthwise through the flow through plug.

13 Claims, 3 Drawing Sheets

FLOW THROUGH TUBE PLUG

CROSS REFERENCE TO RELATED PATENT APPLICATIONS

This is a non-provisional patent application of now abandoned U.S. provisional patent application Ser. No. 60/598,026 filed Aug. 2, 2004.

The present invention is related to a method and apparatus for the repair of damaged tubes, including tubes disposed within heat exchangers.

Tubular members used for transporting fluids are susceptible to erosion damage caused by the fluid flowing within the tubular member. This tubular erosion is due in part to irregular flow patterns, such as eddy currents, formed within the fluid as it enters the tubular member. The irregular flow patterns can focus fluid flow of increased velocity against specific locations within the tubular member, thereby eroding the material of the tubular member at these specific locations. For the purposes of this disclosure, tubular members include tubes within various processing apparatus, such as furnaces, reactors (chemical and nuclear), and heat exchangers, to name but a few.

With regard to heat exchangers, tubular erosion can occur when the temperature of the fluid within the tube side is significantly higher than the fluid within the shell side of the heat exchanger. Heat exchanger tube erosion during high temperature gradients is exacerbated when the tube is constructed of an alloy. When subjected to high temperatures corrosion resistant elements within the alloy material of the tube precipitate out of their original location and migrate towards the grain boundaries of the material. Ultimately this results in a large portion of the material being unprotected against corrosion. This type of damage is often troublesome at tube entrances and tube exits. As can be seen in FIGS. 2 and 3, migration of corrosion resistant elements can over time result in corrosion or pitting within a tube 18 thereby creating a damaged area 22. Typically these damaged areas 22 occur proximate to the opening of apertures 12 of a tubesheet 10 and on lip 13 of the aperture 12 where the tube 18 is often welded to the tubesheet 10. This type of damage is commonly known by those of ordinary skill in the art as heat affected zone corrosion. Left unchecked, the corrosion in the damaged area 22 can erode through the tube 18 thereby allowing the fluid in the tubeside to leak into the shell side of the heat exchanger, or vice-versa depending on the pressure gradients.

Tubular erosion can also have a damaging effect in situations where the heat exchanger tubesheet is cladded or laminated. As is well known, cladded or laminated tubesheets are comprised of a cladding tubesheet 14 mechanically bonded to a backing tubesheet 16 (see FIGS. 1 and 2). Cladding is typically used in situations where a special material is needed to withstand the corrosive or otherwise harsh effects of a tubeside fluid. Since materials that are resistant to corrosion, such as zirconium, are often expensive, the corrosion resistant material is clad over the less expensive material in an effort to reduce costs. However the mechanical bond used to adhere the cladding tubesheet 14 to the backing tubesheet 16 can sometimes deteriorate thereby allowing the cladded tubesheet 10 to come apart and allow areas of delamination 20. Sufficient delamination of the cladded tubesheet 14 from the backing tubesheet 16 reduces the mechanical strength of the cladded tubesheet. Delamination also removes the protective layer provided by the cladding tubesheet 14, which may subject the backing tubesheet 16 to the corrosive effects of the tubeside fluid.

Current remedies for corroded tubes include securing a solid plug 24 to the entrance of a tube 18, which can be further secured with a weld 26. While this method of sealing the tube can serve to isolate a damaged area 22 from additional corrosion, the heat exchanging function of that repaired tube is lost once it is plugged, which in turn reduces the overall effectiveness and efficiency of the heat exchanger. Alternatives to plugging damaged tubes can be found in the following references: U.S. Pat. Nos. 4,941,512; 5,201,118; and 5,167,907.

These alternative fixes include inserting a sleeve within the tube 18 to cover the damaged area 22 and employing a rolling technique onto an end of the sleeve to secure it to the lip 13 of the aperture. This method requires that an expensive rolling machine be on hand, with a technician to operate the machine, for shaping the tube ends. Unfortunately this procedure is unable to repair damage to the circumferential tube-to-tubesheet weld area and cannot provide the bubble-tight seal between the sleeve and the inner diameter of the damaged tube that is required to prevent further tube damage. Additionally, this procedure does not correct cladded tubesheet delamination.

Repair techniques for tube-to-tubesheet welds also exist to address corrosion damage in the circumferential weld area at the lip 13 of the aperture 12. For example, the circumferential weld area at the lip 13 of apeture 12 can be mechanically ground and fresh metal, preferably the same material as the metal of the tubesheet 10, can be applied through conventional welding methods. Unfortunately, this weld-repair method does not address damage to the inner diameter of tube 18. Further, in the case of exchangers comprising corrosion resistant metallurgy, such as for example zirconium, high quality, full-penetration welds are in practice difficult to achieve under repair conditions and are very costly to attempt. Lastly, with respect to cladded tubesheets, circumferential weld-repairs fail to adequately address delamination issues.

Thus, there still exists a need for a method and apparatus capable of permanently repairing damage to the interior portion of tubes without hindering flow through the tube. A need also exists for a method and apparatus for repairing the circumferential tube-to-tubesheet weld area at the lip of the tube. Additionally, a need also exists for a method and apparatus for relaminating, or preventing the delamination of, cladded tubesheets that may occur in combination with or independent of the aforementioned tube and weld damage.

The present invention relates to a method of repairing an apparatus having a tubular member wherein the tubular member has a damaged portion. More particularly, the method of the present invention comprises: inserting a flow through plug within the tubular member with a force directed substantially axially relative to the tube; and pressing the flow through plug within the tubular member thereby covering at least a portion of the damaged portion of the tubular member with the flow through tube plug, wherein said flow through plug has a longitudinal axis and an aperture along said axis suitable for allowing fluid flow therethrough. The flow through plug is pressed within the tubular member with sufficient force to create a press fit between the flow through plug and the tubular member.

In another aspect of the present invention, a method of repairing a tubesheet having delaminated sections is provided, wherein each section of the tubesheet includes tube apertures formed therethrough, and the method comprises: inserting a flow through plug within at least one of the tube apertures, wherein the flow through plug has a longitudinal axis and an aperture along said axis and said flow through plug is tapered; and applying a force to said flow through plug sufficient to create a press fit between said flow through plug and each section of the tubesheet, thereby relaminating each of the sections of the tubesheet.

In still another embodiment of the present invention, a method of forming a laminated tubesheet having at least two sections with tube apertures, is provided. This method comprises: positioning each of the sections adjacent one another; aligning the tube apertures on each adjacent section with one another; and inserting at least one flow through plug in said aligned tube apertures with sufficient force to securely engage each tubesheet section thereby forming a laminated tubesheet.

In still another embodiment, the present invention relates to an apparatus comprising at least one tubesheet having an aperture formed therethrough; a tubular member inserted within said aperture; and a flow through plug axially disposed within said tubular member. The apparatus may further comprise a damaged portion within the tubular member wherein an outer surface of the flow through plug covers at least a portion of the damaged portion.

Other and further features and advantages of the present invention will be apparent from the following description of various embodiments of the invention. These embodiments are given for the purpose of disclosure and may be considered in conjunction with the accompanying drawings.

A more complete understanding of the present embodiments and advantages thereof may be acquired by referring to the following description taken in conjunction with the accompanying drawings, in which like reference numbers indicate like features, and wherein.

Figure 1:
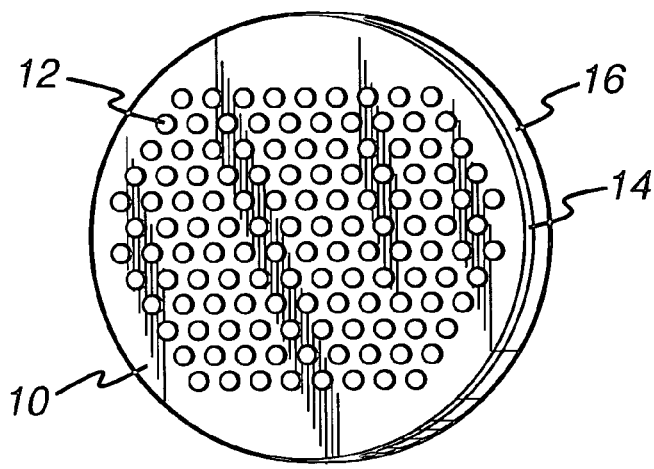
FIG. 1 is a perspective view of a cladded tubesheet.
Figure 2:
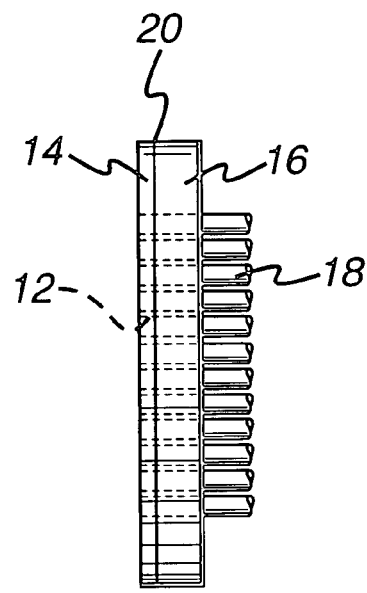
FIG. 2 depicts a partial cutaway view of a laminated tubesheet of a heat exchanger with associated tubes.
Figure 3:
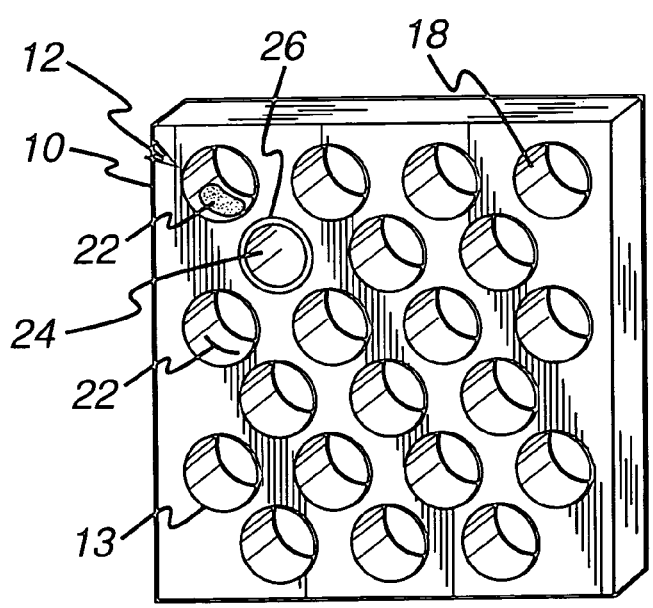
FIG. 3 illustrates a perspective view of a portion of a tubesheet.
Figure 4:
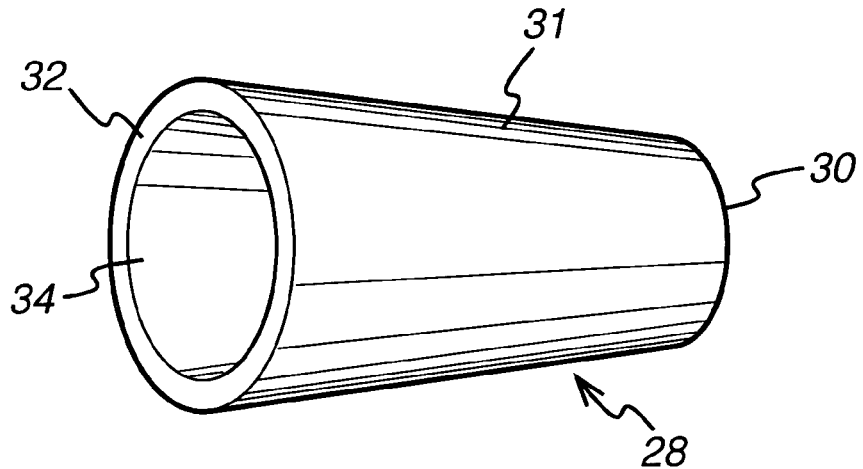

FIG. 4 portrays an embodiment of a flow through plug of the present invention.

Figure 5:
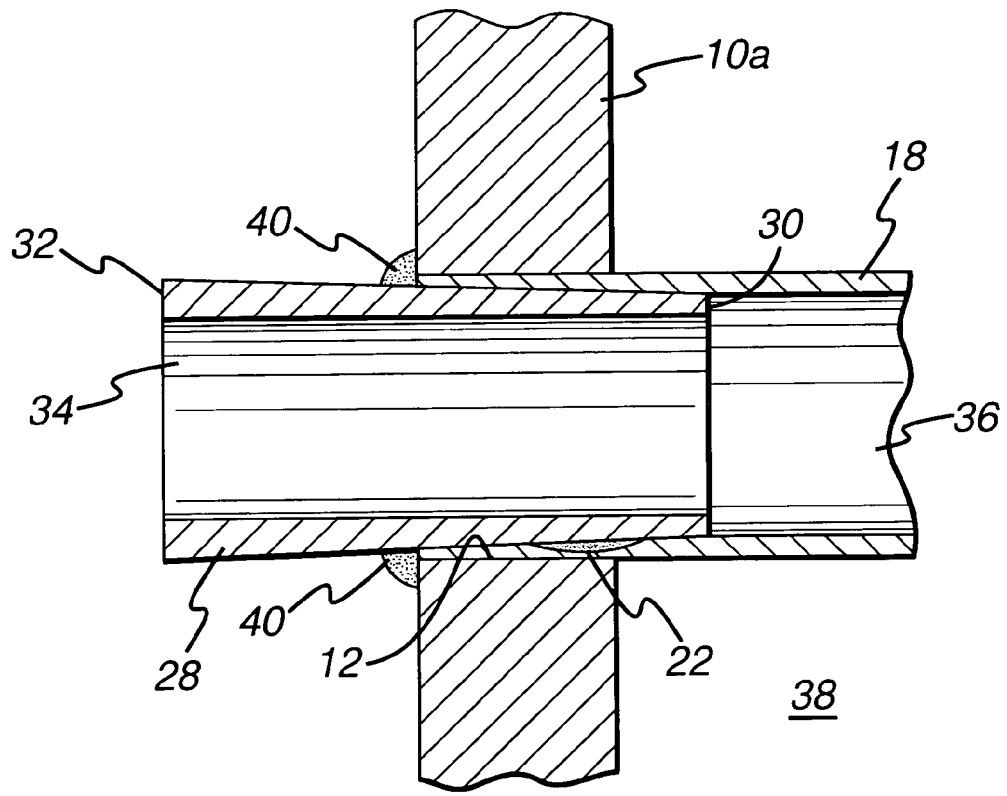

FIG. 5 is a cutaway view of an embodiment of a flow through plug of the present invention inserted within a tube of a heat exchanger.

Figure 6:
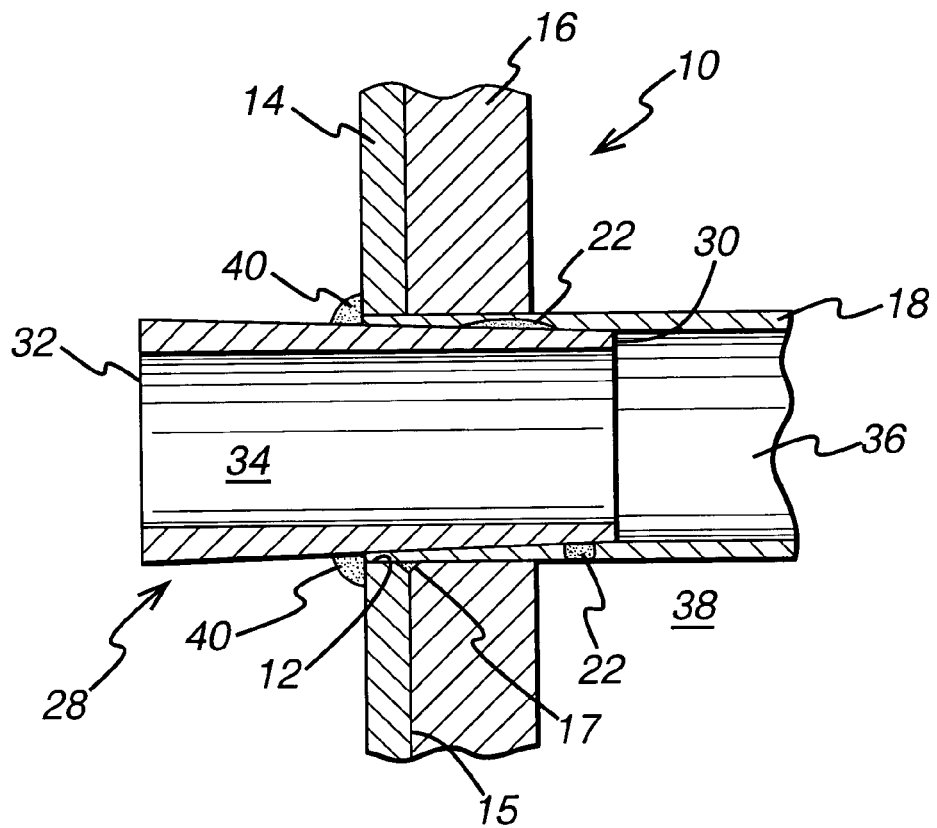

FIG. 6 depicts a cutaway view of an embodiment of a flow through plug of the present invention inserted within a tube of a heat exchanger having a laminated tubesheet.

Figure 7:
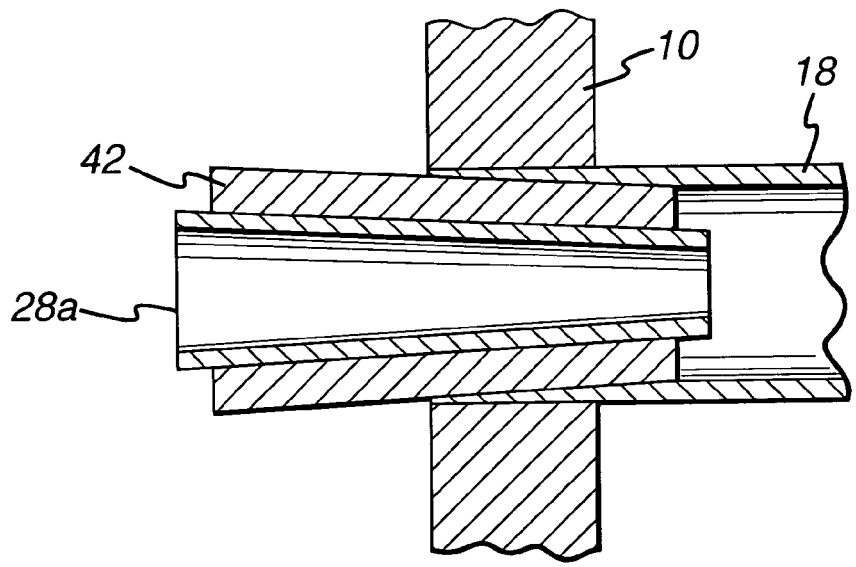

FIG. 7 illustrates a cutaway view of an alternative embodiment of the present invention.

One embodiment of the present invention is illustrated in FIG. 5. In this figure a flow through plug 28 is shown inserted within the opening of the tube 18 and disposed within the aperture 12 of the tubesheet 10*a*. The flow through plug 28 is preferably tubular having a longitudinal axis and a hollowed out core aperture 34 along its axis. The flow through plug 28 can be machined, forged, or formed from any other known or later developed method of manufacture.

In one embodiment, the internal diameter of the flow through plug may be constant along the length of the plug. Alternatively, the inner surface of the flow through plug may be tapered along its length such that the internal diameter of its rearward end 32 is greater than the internal diameter of its forward portion 30. In yet another embodiment, the geometry of the inner surface of the flow through plug may be that of a converging/diverging nozzle, or a venturi, such that pressure drop through the flow through plug is minimized. The inner surface of the flow through plug may be polished to reduce the occurrence of fouling.

The outer surface of the flow through plug 28 may be tapered along its length such that the outer diameter of its rearward end 32 is greater than the outer diameter of its forward portion 30. The taper shown in FIG. 4 has been exaggerated to illustrate this feature. While the taper dimensions of the flow through plug 28 can range from as low as a slope of 0.83 centimeters per meter (0.1 inches per foot) to in excess of 50 centimeters per meter (6 inches per foot), the present invention can accommodate tapers of any size. While the slope of the taper can be substantially constant along the length of the flow through plug 28, it is envisioned that alternative embodiments comprising tapers of variable slope may also be useful. In one embodiment, the outer surface of the flow through plug 28 may be of constant diameter such that the outer diameter of its rearward end 32 is substantially constant up to midpoint 31; moving from midpoint 31 toward forward portion 30, the flow through plug may then be tapered along its length such that the outer diameter of midpoint 31 is greater than the outer diameter of its forward portion 30. The flow through plug 28 may also incorporate one or more external geometric features including but not limited to as ribs, vanes, baffles, dimples, indentations, rifling, or flaring. Additionally, the outer surface of the flow through plug 28 can be contoured with threads, roughened, or provided with a knurled surface thereby providing an additional connective means for the flow through plug 28 as it is attached within the tubesheet 10.

As shown in FIG. 5, the tapered length of the flow through plug 28 allows the forward portion 30 of the flow through plug 28 to be inserted to a finite distance within the tube 18 and be press fit therein. The press fit should create a pressure seal along the interface of the outer surface of the flow through plug 28 and the inner surface of the tube 18 sufficient to prevent fluid flow across this interface. Accordingly it is important that the forward portion 30 of the flow through plug 28 extend past the damaged portion 22 of the tube 18 thereby ensuring the damaged portion 22 is contacted by and at least partially covered by a portion of the outer surface of the flow through plug 28. The entire surface of the damaged portion 22 of the tube 18 may be covered by the flow through plug 28 to prevent fluid leakage from the tube 18 through the damaged portion 22.

Typically the flow through plug 28 can be manually pressed into the tube 18 with a hammer, however it can also be pressed in place with an automated tool, or can be pressed by any other now known, or later developed, method. The amount of force required to create the proper press fit is well within the capabilities of those skilled in the art and can be determined without undue experimentation. Optionally, a weld 40 can be formed around the region where the outer diameter of the flow through plug 28 contacts the front surface of the tubesheet 10*a*. While the weld 40 is not necessary to retain the flow through plug 28 in place once it is press fit within the tube 18, it can be added as a supplementary measure to prevent movement of the flow through plug 28 after its installation. To accommodate the optional weld 40 on the flow through plug 28, the rearward portion 32 of the flow through plug 28 should not be flush with the tubesheet 10, but instead should protrude outward from the tubesheet 10.

The flow through plug 28 can be made of any material suitable for use in conjunction with heat exchangers, such as carbon steel, stainless steel, inconel, tantalum, and zirconium, to name a few. Additionally, the flow through plug 28 can be comprised of a base material that is generally thought not to be corrosion resistant, such as carbon steel, combined with a covering capable of resisting corrosion such as glass, epoxy, elastomer, fluoropolymer (e.g., TEFLON®), or one of the above-listed metals. In some embodiments, the flow through plug may comprise one or more ceramic materials selected from the list including silicon nitride, alumina, and silicon carbide. Ultimately though, the actual material used will depend on the material of the tubesheet (10, 10*a*) and tube 18, as well as the fluid type and operating conditions that the flow through plug 28 is subjected to.

With reference now to FIG. 6, a flow through plug 28 is shown inserted within a tube 18, where the tube 18 is positioned within a laminated tubesheet 10. Here the flow through plug 28 is press fit within the tube 18 such that its forward portion 30 extends within the tube 18 past the damaged area 22 of the tube. As noted above, a proper press fit of the flow through plug 28 within the tube 18 seals the region between the flow through plug 28 and the tube 18 thus preventing fluid flow through the damaged area 22. It should be pointed out that the forward portion 30 should extend past both the cladding tubesheet 14 and the backing tubesheet 16 sections of the tubesheet 10. One of the advantages of installing the flow through plug 28 of the present invention in a laminated tubesheet is that the press fit between the flow through plug 28 and the tube 18 pushes the outer diameter of the tube 18 against the inner diameter of the aperture 12 of both the cladding and the backing tubesheet (14, 16). The stresses resulting from the interaction of the tube 18 and aperture 12 form a mechanical bond between the flow through plug 28 and both the cladding tubesheet 14 and the backing tubesheet 16. Moreover, in some instances where a gap 17 exists in the interface 15 between the cladding and the backing tubesheet (14, 16), the outer diameter of the tube 18 can be deformed by the presence of the flow through plug 28 and squeezed into the gap 17. Accordingly, press-fitting the flow through plug 28 within the tube 18, as shown in FIG. 6, in turn bonds the cladding tubesheet 14 to the backing tubesheet 16. As such, one of the many advantages of the present invention is its ability to bond the sections of a laminated tubesheet together. This feature can be used to repair tubesheets with multiple sections that have become delaminated, as well as for forming new laminated tubesheets. Here also, an optional weld 40 can be used to ensure adhesion of the flow through plug 28 to the tubesheet 10.

Flow through plug 28 may be installed within the tube 18 in a manner similar to that used to install conventional solid plugs. As previously noted, during initial fabrication of a heat exchanger, the edge of the tube 18 proximate to the tubesheet lip 13 is "rolled" into securing contact with the tubesheet 10. Although the force of rolling the tube 18 is applied to the inner diameter of the tube 18, the inner diameter remains relatively parallel with the outer diameter of the tube 18. Thus in order to receive the flow through plug 28 that has been tapered, a corresponding taper can be reamed into the inner diameter of the tube 18 prior to installation of the flow through plug 28. Any conventional means may be employed to ream the inner diameter of the tube 18, such as, for example without limitation, with a Jarno taper. Implementation of the reaming function will depend upon an analysis of the specific situation of the heat exchanger, for example, tubes having excessive corrosion and or scale will most likely require reaming, whereas tubes having thin walls may not have sufficient material to be reamed. Further, reaming may not be required in instances where the tube 18 comprises metallurgy sufficiently malleable to conform to the exterior geometry of the flow through plug 28 when it is press fit into the tube 18. However it is well within the capabilities of those skilled in the art to determine if reaming is required. Reaming the tube 18 enables insertion of the tapered flow through plug 28 within the opening of the tube 18 and yet provides sufficient mass around the flow through plug 28 that in turn presses against the inner diameter of the apertures 12 of the tubesheet 10 as the flow through plug 28 is driven through the aperture 12.

In an alternative embodiment of the present invention, as shown in FIG. 7, a collar 42 is included in conjunction with an embodiment of a flow through plug 28*a*. The collar 42, as seen in cross sectional view, circumscribes a portion of the flow through plug 28*a* and is tapered along its inner diameter to match the taper on the outer diameter of the flow through plug 28*a*. The outer diameter of the collar 42 is pressed into the tube 18 and can be appropriately sized to cover a damaged area 22 within the tube 18 to prevent leakage through the tube 18. The presence of the collar 42 can also urge the tube 18 radially outward such that in the case of a cladded tubesheet, the outwardly directed radial force of the tube 18 caused by the presence of the collar 42 can bond the cladded portions of the tubesheet together. Optionally, the collar 42 can be installed within the tube 18 without the additional flow through plug 28*a*. In some instances it may be beneficial to utilize the two-piece assembly comprising collar 42 and flow through tube plug 28*a* in an alternative installation; that is, the collar 40 and the flow through tube plug 28*a* are first inserted within the tube 18 as shown in FIG. 7. Subsequent to being press fit, the flow through tube plug 28*a* is removed. An optional circumferential weld may be added between the tubesheet and collar 42 as well. In such an embodiment, this modified installation method would allow the collar 42 to provide the functional benefits of a flow through tube plug in the repair method of the present invention.

The flow through plug 28 of the present invention can be utilized in the repair of tubular members disposed within various types of apparatus, such as various types of processing units, including but not limited to, heat exchangers, furnaces, reactors, and other fluids handling hardware having tubular members. For example, the method of the present invention may be used with both forced circulation-type and thermosiphon-type distillation column reboilers, such as those used in the purification of materials including but not limited to acrylic acid, acrylic acid esters, acrylonitrile and styrene. Such reboilers may include separate vessels that are connected to distillation columns by piping elements, as well as integral heat transfer devices, such as for example bayonet-type exchangers which may be incorporated into the lower (sump) portion of distillation columns.

Similarly, other exchangers comprising tubular members, including but not limited to condensers, heaters, vaporizers, coolers, intercoolers, and cross-exchangers, may benefit from use of the method of the present invention. These can be found in processes for manufacturing of materials including but not limited to methacrylic acid, methacrylic acid esters, methacrylonitrile, and hydrogen cyanide. For example, the method of the present invention is suitable for repair of shell and tube type cracker reactor pre-heaters, heaters, and coolers, such as those employed in processes for production of methyl methacrylate (MMA) or methacrylic acid (MAA), and described for example in U.S. Pat. No. 6,545,176, which is herein incorporated by reference in its entirety.

The method of the present invention may also be beneficially used with direct fired steam boilers, as well as waste heat recovery boilers associated with furnace, incinerator, thermal oxidizer, and gas turbine systems, which comprise tubular members. The method of the present invention is, for example, suitable for repair of tubes within the waste heat recovery steam boiler of a thermal oxidizer system, such as those systems employed in processes for the production of acrylonitrile, and described for example in US 2004/0093860, which is herein incorporated by reference in its entirety. Further, the method of the present invention may be beneficially employed to repair tubular members within refrigeration systems, chillers, brine coolers, and air conditioning systems.

In addition to the above mentioned examples, the method of the present invention may be used with exchangers wherein the tubeside fluid is a process gas, rather than a liquid, such as for example in quench exchangers used in the production of nitric acid, or synthesis gas ("syngas"). The method of the present invention can be used for the repair of shell and tube type quench exchangers employed in the production of hydrogen cyanide, several embodiments of which are described for example in US 2001/0040024, which is herein incorporated by reference in its entirety. It is further envisioned that the flow through plugs of the present invention may be beneficially used in combination with ferrules, including ferrules formed from inconel, alumina, silica, silicon carbide, and silicon nitride, and described for example in US 2001/0040024. Similarly, tubular members in gas-to-gas exchangers, such as those used in direct-fired preheaters and recuperators, may also benefit from the method of the present invention.

As noted above, use of the present invention is not limited to heat exchangers and furnaces, and thus the method of the present invention may also be employed in the repair or construction of any type of tubular members useful for transporting fluids. For example, the present invention may be used to repair reactors comprising tubes, such as for example partial oxidation reactors and nuclear reactors. Examples of partial oxidation reactors comprising tubes include but are not limited to those used in the production of (meth)acrolein, (meth)acrylic acid, maleic anhydride, vinyl chloride monomer (VCM), and ethylene oxide. The method of the present invention is suitable for repair of reactors comprising one or more catalyst-containing tubular members, such as those reactors employed in processes for production of acrolein and acrylic acid from hydrocarbons including propylene and propane. Such reactors being described for example in U.S. Pat. No. 6,384,274, which is herein incorporated by reference in its entirety.

EXAMPLE

In a non-limiting example, the present repair method was utilized in a process involving the production of methacrylic acid ("MAA") and methacrylic acid esters (e.g., methyl methacrylate, "MMA"). More specifically, the method of the present invention was employed in a shell-and-tube heat exchanger that introduced heating into the process for stripping or removing organic components from a sulfur-bearing residue stream. The particular stripping process in which the particular heat exchanger is disposed is explained in detail in pending Patent Application Number US 2002/0192131 A1 the entirety of which is incorporated by reference herein.

The example heat exchanger comprised approximately 550 zirconium tubes with an internal diameter of 1.370 inches (3.48 centimeters, "cm"). These tubes were rolled and seal welded to a zirconium cladded tubesheet. The zirconium cladded tubesheet comprised a nominal 3/8 inch (0.95 cm) thick zirconium cladding tubesheet explosion-clad to a nominal 2 inches (5 cm) thick carbon steel backing tubesheet. Sulfur-bearing residue, comprising sulfuric acid and water, was continuously circulated through the tubeside of the exchanger at a temperature of between 115° C. (240° F.) and 143° C. (290° F.). The shell of the exchanger comprised carbon steel. Medium pressure steam (approximately $5.2 \times 10^5$ Pa (75 psig)) was utilized as the shell-side heating medium.

Over several years of commercial service, a total of approximately 10% of the original tubes in the heat exchanger had been damaged. This damage was identified by routine mechanical inspection and then addressed by sealing the damaged tubes using conventional solid plugs, in combination with a circumferential seal weld between each plug and the tubesheet. By sealing these tubes, it was possible to return the exchanger to stripping process service. However, the impact of plugging the damaged tubes was a loss of approximately 10% of the available heat transfer surface of the exchanger, with a corresponding loss in production capacity.

After a subsequent period of commercial operation, mechanical inspection identified 97 additional tubes with significant heat affected zone corrosion including: circumferential weld damage, significant internal tube wall corrosion, and perforation of the tube wall. In the case of the perforated tubes, evidence of corrosion of the backing tubesheet and resulting delamination in the cladded tubesheet was also identified.

Given the extent of the damage, it was not practical to utilize conventional solid plugs to seal the damaged tubes, as this would result in the loss of another 20% of the remaining heat transfer surface of the exchanger, forcing the stripping process to operate significantly below the desired production capacity. It was proposed to employ the repair method of the present invention in order to avoid the expense of a complete replacement of the zirconium heat exchanger.

In accordance with the repair method of the present invention, the interior of each of the damaged tubes was first reamed using a conventional #12 size Jarno taper (5 centimeters per meter (0.6 inches per foot)). The exact depth of reaming varied somewhat from tube to tube, depending on the extent of tube damage, the dimensions of the flow through plug, and the relative roundness of each tube. Typically, however, the reaming device was inserted into the tubes to a depth of between 0.01 meters (0.5 inches) and 0.05 meters (2 inches).

After reaming, a 0.05 meter (2 inches) long zirconium flow through plug of the type depicted in FIG. 4 was then inserted into the end of the tube by hand. The outer surface of the flow through plug was tapered along its length such that the outer diameter of its rearward end was about 0.04 meters (1.49 inches) and the outer diameter of its forward portion was about 0.03 meters (1.39 inches). The flow through plug had a constant internal diameter along its axis of 0.028 meters (1.125 inches). The flow through plug was then manually driven into the tube using a hammer until the plug was fully seated. In general, the flow through plug was found to be fully seated when it obtained a depth of between 0.01 meters (0.50 inches) and 0.445 meters (1.75 inches) into the tube. After seating, a circumferential seal weld between the tubesheet and the flow through plug was added.

Upon completion of repairs, the heat exchanger was returned to stripping process service and found to perform without noticeable loss of heat transfer surface area. After nine months of continuous operation at the desired production capacity, the exchanger was once again shutdown and inspected. No significant new damage was identified and no repairs were required. No visible damage was found on the flow through plugs and the exchanger was once again returned to stripping process service. Thus it can be seen from this example that the repair method of the present invention is effective at repairing damaged tubes and delaminations of cladded tubesheets, without hindering flow through the tube.

The present invention described herein, therefore, is well adapted to carry out the objects and attain the ends and advantages mentioned, as well as others inherent therein. While several embodiments of the invention have been given for purposes of disclosure, numerous changes in the details of procedures may be made for accomplishing the desired results. For example, the present invention may be used to repair both forced circulation- and thermosiphon-type distillation column reboilers, such as those used in the purification of (meth)acrylic acid and (meth)acrylic acid esters. The present invention may also be used to repair quench exchangers, wherein the tubeside fluid is a gas, rather than a liquid, such as for example in apparatus used in the production of hydrogen cyanide, nitric acid, or synthesis gas ("syngas"). Additionally, the present invention is not limited to heat exchangers, but can be used in the repair of any type of tubular members useful for transporting fluids. Furthermore, the present invention can be employed onto newly fabricated heat exchangers, either as a preventative measure against erosion as well as bonding together sections of a cladded tubesheet. Additionally, the protective feature of the present invention can be utilized on undamaged existing heat exchangers in order to prevent erosion in tubes. These and other similar modifications will readily suggest themselves to those skilled in the art, and are intended to be encompassed within the spirit of the present invention disclosed herein and the scope of the appended claims.

The invention claimed is:

1. A method of repairing an apparatus having a tubular member wherein the tubular member has an inner surface and a damaged portion, said method comprising:
   inserting a flow through plug within the tubular member with a force directed substantially axially relative to the tube, wherein said flow through plug has a forward portion with a diameter and which is inserted first into the tubular member, a rearward end having a diameter, and an outer surface tapered such that the outer diameter of the rearward end is greater than the outer diameter of the forward portion; and
   pressing said flow through plug within the tubular member thereby covering at least a portion of the damaged portion of the tubular member with said flow through tube plug, wherein said pressing is performed with sufficient force to create a press fit which creates a pressure seal between the outer surface of the plug and the inner surface of the tubular member;
   wherein said flow through plug has a longitudinal axis and an aperture along said axis suitable for allowing fluid flow therethrough.

2. The method of claim 1, wherein said apparatus is selected from the group consisting of a heat exchanger, a furnace, and a reactor.

3. The method of claim 1 wherein the apparatus includes a cladded tubesheet comprised of a backing tubesheet and a cladding tubesheet.

4. The method of claim 3, wherein after pressing said flow through plug within the tubular member, the tubular member is in locking contact with the backing tubesheet and the cladding tubesheet is secured to the backing tubesheet.

5. A method of repairing a tubesheet having delaminated sections, wherein each said section includes tube apertures formed therethrough, said method comprising:
   inserting a flow through plug within at least one of the tube apertures wherein said flow through plug has a longitudinal axis, an aperture along said axis, a rearward end having a diameter, a forward portion with a diameter which is inserted first into the tubular member, and an outer surface which is tapered such that the outer diameter of the rearward end is greater than the outer diameter of the forward portion; and
   applying a force to said flow through plug sufficient to create a press fit between said flow through plug and each section of the tubesheet, thereby creating a pressure seal therebetween and relaminating each of the sections of the tubesheet.

6. A method of forming a laminated tubesheet having at least two sections with tube apertures, said method comprising:
   positioning each of said sections adjacent one another;
   aligning the tube apertures on each adjacent section with one another; and
   inserting at least one flow through plug in said aligned tube apertures, wherein said flow through plug has a forward portion with a diameter and which is inserted first into the tubular member, a rearward end having a diameter, and an outer surface tapered such that the outer diameter of the rearward end is greater than the outer diameter of the forward portion, said inserting being performed with sufficient force to create a pressure fit and securely engage each tubesheet section thereby forming a laminated tubesheet.

7. The method of claim 6, wherein said at least one flow through plug has a longitudinal axis and an aperture along said axis.

8. The method of claim 6, wherein the laminated tubesheet is disposed within an apparatus selected from the group consisting of a heat exchanger, a reactor, and a furnace.

9. The method of claim 6, further comprising welding said flow through plug to the laminated tubesheet.

10. An apparatus comprising:
    at least one tubesheet having an aperture formed therethrough;
    a tubular member having an inner surface and being inserted within said aperture; and
    a flow through plug axially disposed within said tubular member, said flow through plug having a rearward end having a diameter, a forward portion with a diameter which is inserted first into the tubular member, and an outer surface which is tapered such that the outer diameter of the rearward end is greater than the outer diameter of the forward portion, wherein there is a press fit which creates a pressure seal between the outer surface of the plug and the aperture of said at least one tubesheet.

11. The apparatus of claim 10, wherein said apparatus is selected from the group consisting of a heat exchanger, a furnace, and a reactor.

12. The apparatus of claim 10, further comprising a damaged portion within the tubular member wherein said outer surface of said flow through plug covers at least a portion of the damaged portion.

13. The apparatus of claim 11 wherein said at least one tubesheet is a laminated tubesheet comprised of at least two tubesheet sections, wherein said press fit comprises a laminating force maintaining the sections in laminated contact.

* * * * *